(12) United States Patent
Zurmehly et al.

(10) Patent No.: US 10,907,487 B2
(45) Date of Patent: Feb. 2, 2021

(54) TURBINE SHROUD ASSEMBLIES FOR GAS TURBINE ENGINES

(71) Applicant: HONEYWELL INTERNATIONAL INC., Morris Plains, NJ (US)

(72) Inventors: Luke Zurmehly, Phoenix, AZ (US); Jason Smoke, Phoenix, AZ (US); Kent L Kime, Phoenix, AZ (US); Blake Petersen, Scottsdale, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 110 days.

(21) Appl. No.: 16/161,250

(22) Filed: Oct. 16, 2018

(65) Prior Publication Data

US 2020/0116037 A1 Apr. 16, 2020

(51) Int. Cl.
*F01D 9/04* (2006.01)
*F01D 25/24* (2006.01)

(52) U.S. Cl.
CPC .............. *F01D 9/04* (2013.01); *F01D 25/246* (2013.01); *F05D 2230/60* (2013.01); *F05D 2240/11* (2013.01); *F05D 2240/55* (2013.01)

(58) Field of Classification Search
CPC ....... F01D 9/04; F01D 25/246; F05D 2240/11
See application file for complete search history.

(56) References Cited

U.S. PATENT DOCUMENTS

| 3,801,220 | A | 4/1974 | Beckershoff |
| 3,970,318 | A | 7/1976 | Tuley |
| 5,423,659 | A | 6/1995 | Thompson |
| 6,371,727 | B1 | 4/2002 | Stangeland et al. |
| 6,702,550 | B2 | 3/2004 | Darkins, Jr. et al. |
| 6,733,235 | B2 | 5/2004 | Alford et al. |
| 6,814,538 | B2 | 11/2004 | Thompson |
| 6,821,085 | B2 * | 11/2004 | Darkins, Jr. ............ F01D 11/08 415/116 |

(Continued)

FOREIGN PATENT DOCUMENTS

| EP | 1176285 A2 | 1/2002 |
| GB | 2244523 A | 12/1991 |
| JP | 2001248404 A | 9/2001 |

*Primary Examiner* — Kenneth J Hansen
*Assistant Examiner* — Brian O Peters
(74) *Attorney, Agent, or Firm* — Lorenz & Kopf, LLP

(57) ABSTRACT

A turbine shroud assembly includes a shroud support and a shroud segment. The shroud support structure includes a forward support rail and an aft support rail. The forward support rail includes forward first engagement structures and the aft support rail includes aft first engagement structures. The shroud segment includes a forward segment rail and an aft segment rail. The forward segment rail includes forward second engagement structures positioned on a forward segment rail periphery and the aft segment rail includes second engagement structures positioned on an aft segment rail periphery. The forward first engagement structures radially and circumferentially engage with the forward second engagement structures and the aft first engagement structures radially and circumferentially engage with the aft second engagement structures to radially and circumferentially interlock the shroud segment to the shroud support structure.

20 Claims, 7 Drawing Sheets

(56) References Cited

U.S. PATENT DOCUMENTS

| | | | |
|---|---|---|---|
| 6,899,518 B2* | 5/2005 | Lucas | F01D 9/04 |
| | | | 415/116 |
| 7,278,820 B2* | 10/2007 | Keller | F01D 11/08 |
| | | | 415/173.1 |
| 7,338,253 B2 | 3/2008 | Nigmatulin | |
| 7,344,359 B2 | 3/2008 | Deallenbach | |
| 7,874,791 B2 | 1/2011 | Ferber et al. | |
| 8,333,553 B2 | 12/2012 | Liebl et al. | |
| 8,662,852 B2 | 3/2014 | Bhokardole et al. | |
| 8,784,052 B2* | 7/2014 | Shi | F01D 25/26 |
| | | | 415/197 |
| 9,228,445 B2 | 1/2016 | Darkins, Jr. et al. | |
| 9,458,726 B2 | 10/2016 | Lamusga et al. | |
| 9,752,445 B2 | 9/2017 | Watanabe | |
| 2005/0002779 A1 | 1/2005 | Tanaka | |
| 2005/0004810 A1 | 1/2005 | Tanaka | |
| 2005/0123389 A1 | 6/2005 | Morris et al. | |
| 2009/0097979 A1 | 4/2009 | Erdmann et al. | |
| 2012/0034086 A1 | 2/2012 | Mishrikotkar et al. | |
| 2012/0051930 A1 | 3/2012 | Pandey et al. | |
| 2012/0195742 A1 | 8/2012 | Jain et al. | |
| 2016/0186569 A1 | 6/2016 | Choi | |
| 2019/0093512 A1* | 3/2019 | Sippel | B32B 18/00 |
| 2020/0063592 A1* | 2/2020 | Barker | F01D 25/246 |
| 2020/0080437 A1* | 3/2020 | Clark | F01D 25/246 |

* cited by examiner

TURBINE SHROUD ASSEMBLIES FOR GAS TURBINE ENGINES

STATEMENT REGARDING FEDERALLY SPONSORED RESEARCH OR DEVELOPMENT

This invention was made with Government support under W58RGZ-16-C-0046 awarded by the U.S. Army. The Government has certain rights in the invention.

TECHNICAL FIELD

The present invention generally relates to gas turbine engines, and more particularly relates to turbine shroud assemblies of gas turbine engines.

BACKGROUND

A gas turbine engine may be used to power various types of vehicles and systems. A particular type of gas turbine engine that may be used to power aircraft is a turbofan gas turbine engine. A turbofan gas turbine engine conventionally includes, for example, five major sections: a fan section, a compressor section, a combustor section, a turbine section, and an exhaust section. The fan section is typically positioned at the inlet section of the engine and includes a fan that induces air from the surrounding environment into the engine and accelerates a fraction of this air toward the compressor section. The remaining fraction of air induced into the fan section is accelerated into and through a bypass plenum and out the exhaust section.

The compressor section raises the pressure of the air it receives from the fan section, and the resulting compressed air then enters the combustor section, where a ring of fuel nozzles injects a steady stream of fuel into a combustion chamber formed between inner and outer liners. The fuel and air mixture is ignited to form combustion gases, which drive rotors in the turbine section for power extraction. In a typical configuration, the turbine section includes rows of stator vanes and rotor blades disposed in an alternating sequence along the axial length of a generally annular hot gas flow path. The rotor blades are mounted at the periphery of one or more rotor disks that are coupled to drive a main engine shaft. The gases then exit the engine at the exhaust section.

Typically, gas turbine engines operate at relatively high temperatures, particularly in the turbine section that is downstream of the combustion section. The high temperature environment may be challenging for certain components with respect to durability and life span, including turbine shroud assemblies that circumscribe the turbine section and partially define the mainstream flow path.

Accordingly, it is desirable to provide improved turbine shroud assemblies with features that enable advantageous operational characteristics, temperature management, durability, and life span. Furthermore, other desirable features and characteristics of the present invention will become apparent from the subsequent detailed description of the invention and the appended claims, taken in conjunction with the accompanying drawings and this background of the invention.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In accordance with an exemplary embodiment, a turbine shroud assembly includes a shroud support and a shroud segment. The shroud support structure includes a forward support rail and an aft support rail extending radially and about a circumferential orientation. The forward support rail includes at least one forward first engagement structure and the aft support rail includes at least one aft first engagement structure. The at least one forward first engagement structure and the at least one aft first engagement structure having respective lengths defined along axial orientations. The shroud segment includes a forward segment rail and an aft segment rail extending radially and about the circumferential orientation. The forward segment rail includes at least one forward second engagement structure positioned on a forward segment rail periphery and the aft segment rail includes at least one aft second engagement structure positioned on an aft segment rail periphery. The at least one forward second engagement structure and the at least one aft second engagement structure having respective lengths defined along the axial orientations. The at least one forward first engagement structure is configured to radially and circumferentially engage with the at least one forward second engagement structure and the at least one aft first engagement structure is configured to radially and circumferentially engage with the at least one aft second engagement structure to radially and circumferentially interlock the shroud segment to the shroud support structure.

In another embodiment, a shroud segment for a turbine shroud assembly of a gas turbine engine having a shroud support structure with a forward support rail that includes at least one forward first engagement structure and an aft support rail that includes at least one aft first engagement structure includes a base, a forward segment rail, and an aft segment rail. The forward segment rail extends radially from the base and along a circumferential orientation parallel to the forward support rail. The forward segment rail includes at least one forward second engagement structure positioned on a forward segment rail periphery, and the at least one forward second engagement structure has a length defined along an axial orientation. The aft segment rail extends radially from the base and along the circumferential orientation parallel to the aft support rail. The aft segment rail includes at least one aft second engagement structure positioned on an aft segment rail periphery, and the at least one aft second engagement structure has a length defined along the axial orientation. The at least one forward second engagement structure is configured to radially and circumferentially engage with the at least one forward first engagement structure and the at least one aft second engagement structure is configured to radially and circumferentially engage with the at least one aft first engagement structure to radially and circumferentially interlock the shroud segment to the shroud support structure.

In yet another embodiment, a turbine shroud assembly includes a shroud support structure and a circumferential series of shroud segments. The shroud support structure includes a body and a forward support rail and an aft support rail extending radially from the body along a circumferential orientation. The forward support rail includes a first array of dovetail projections with axial orientations, and the aft support rail includes a second array of dovetail projections with axial orientations. Each of the shroud segments includes a base and a forward segment rail and an aft segment rail extending radially from the base along the circumferential orientation. The forward segment rail includes a first array of dovetail notches with axial orientations, and the aft segment rail includes a second array of dovetail notches with axial orientations. The first array of dovetail notches of the circumferential series of shroud segments is configured to mate with the first array of dovetail projections of the shroud support structure and the second array of dovetail notches of the circumferential series of shroud segments is configured to mate with the second array of dovetail projections of the shroud support structure such that the circumferential series of shroud segments are radially and circumferentially interlocked to the shroud support structure.

Furthermore, other desirable features and characteristics of the turbine shroud assemblies will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
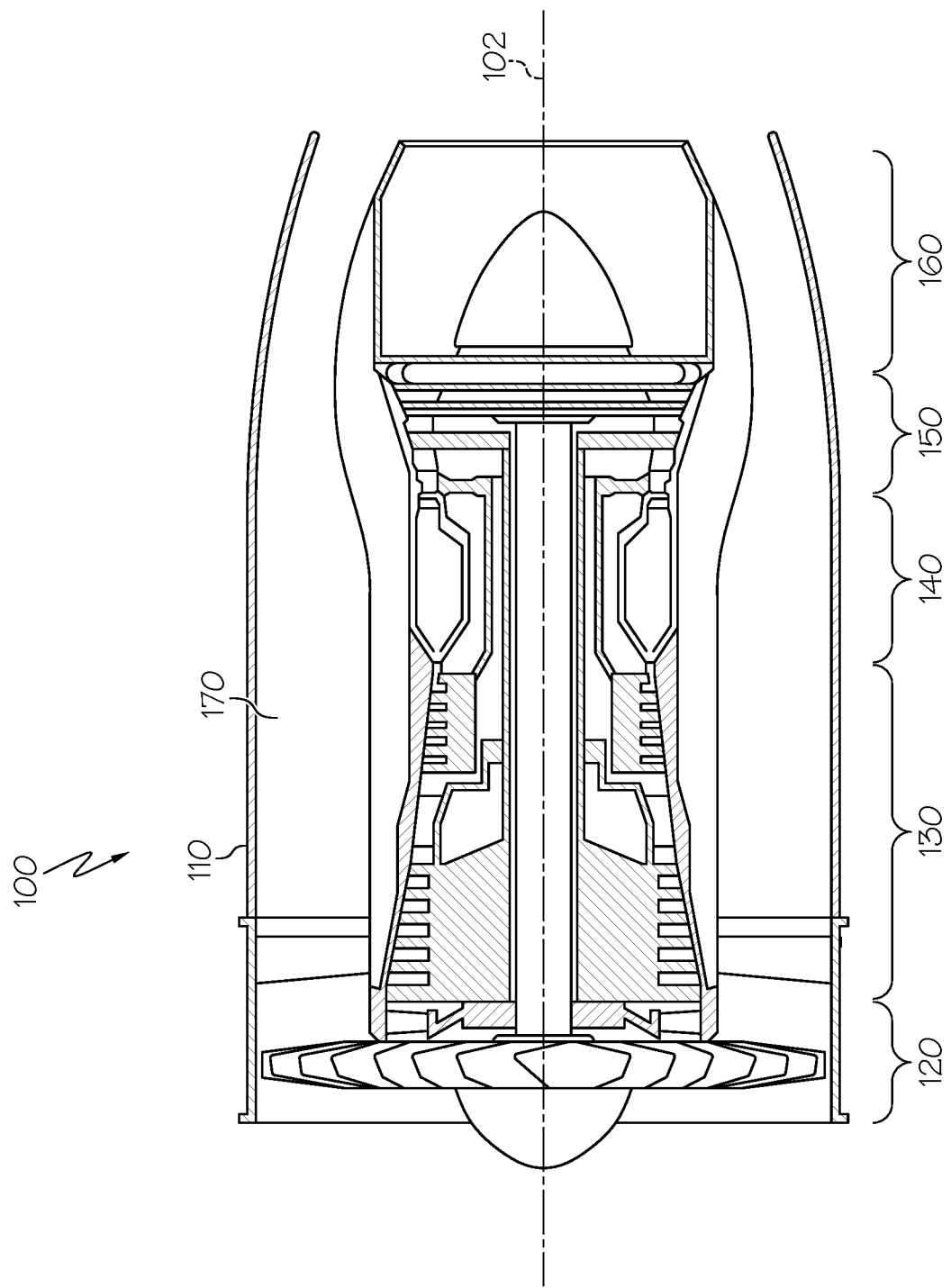
FIG. 1 is a cross-sectional view of a gas turbine engine according to an exemplary embodiment.

FIG. 1 is a cross-sectional view of a gas turbine engine 100 according to an exemplary embodiment. Although FIG. 1 depicts a turbofan engine, in general, exemplary embodiments discussed herein may be applicable to any type of engine, including turboshaft engines, jet engines, turboprop engines, etc. The gas turbine engine 100 may form part of, for example, an auxiliary power unit or a propulsion system for an aircraft or other type of vehicle. The gas turbine engine 100 has an overall construction and operation that is generally understood by persons skilled in the art.

As shown, the engine 100 may be an annular structure about a longitudinal or axial centerline axis 102. In the description that follows, the term "axial" refers broadly to an orientation parallel to the axis 102 about which the rotating components of the engine 100 rotate. This axis 102 runs from the front of the engine 100 to the back of the engine 100. The term "radial" refers broadly to an orientation that is perpendicular to the axis 102 and that points towards or away from the axis of the engine 100. As used below, the terms "inner" and "outer" are relative terms in which "inner" is radially closer to the axis 102 than "outer". The term "circumferential" refers broadly to an orientation at a given point that is normal to the radial orientation and normal to the axial orientation. An "upstream" direction refers to the direction from which the local flow is coming, while a "downstream" direction refers to the direction in which the local flow is traveling. In the most general sense, flow through the engine tends to be from front to back, so the "upstream direction" will generally refer to a forward direction, while a "downstream direction" will refer to a rearward direction. Additionally, the terms "forward" refers to an upstream axial direction and "aft" refers to a downstream axial direction.

The gas turbine engine 100 may be disposed in an engine case 110 and may include a fan section 120, a compressor section 130, a combustion section 140, a turbine section 150, and an exhaust section 160. The fan section 120 may include a fan, which draws in and accelerates air. A fraction of the accelerated air from the fan section 120 is directed through a bypass section 170 to provide a forward thrust. The remaining fraction of air exhausted from the fan is directed into the compressor section 130.

The compressor section 130 may include one or more compressors that raise the pressure of the air directed into it from the fan section 120. The compressors may direct the compressed air into the combustion section 140. In the combustion section 140, the high pressure air is mixed with fuel and combusted. The combusted air is then directed into the turbine section 150. As described in further detail below, the turbine section 150 may include one or more rotor and stator assemblies disposed in axial flow series. The combusted air from the combustion section 140 expands through the rotor and stator assemblies and causes the rotor assemblies to rotate a main engine shaft for energy extraction. The air may then be exhausted through a propulsion nozzle disposed in the exhaust section 160 to provide additional forward thrust.

Figure 2A:
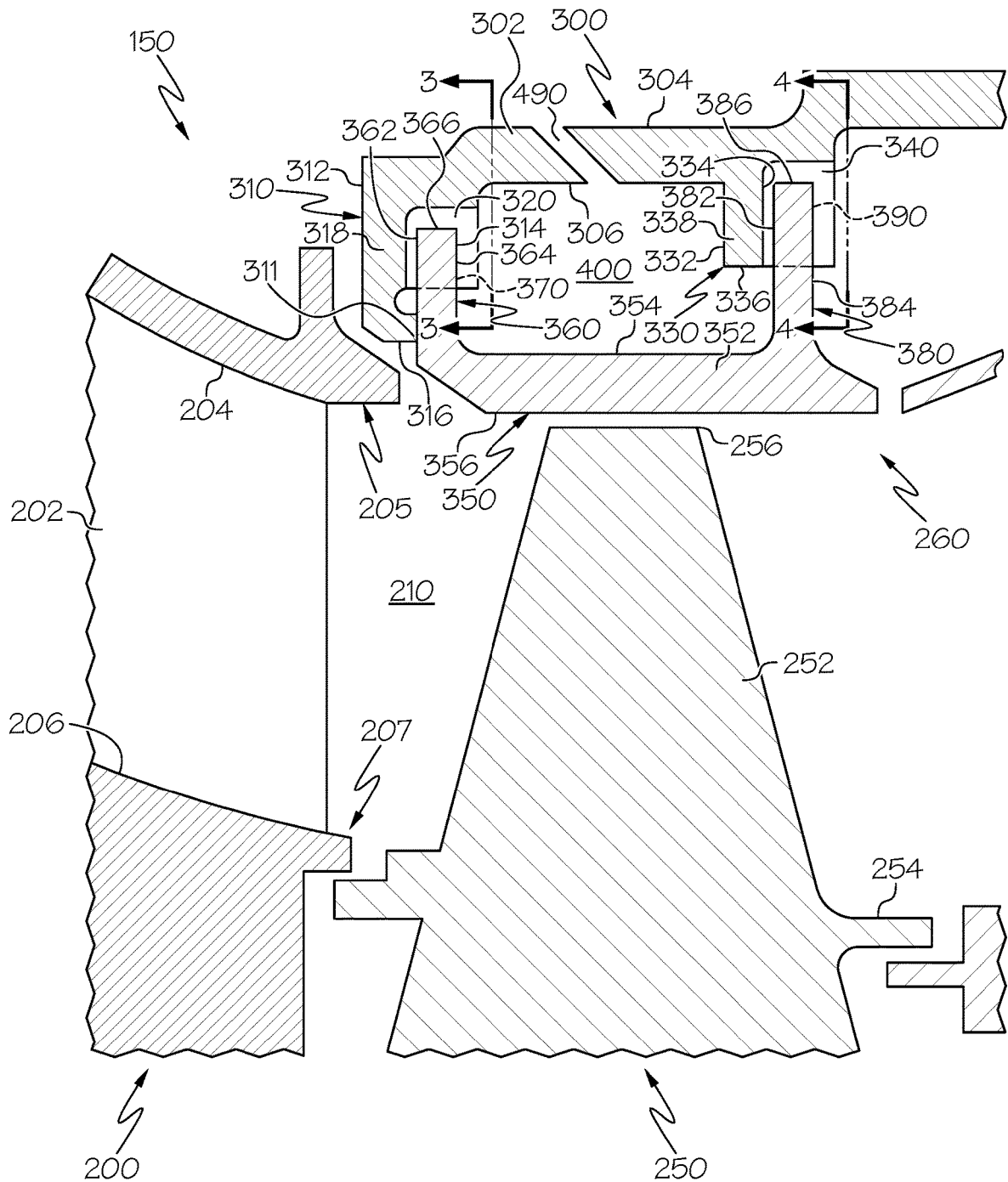
FIGS. 2A-2C depict partial views of at least a portion of a turbine section of the gas turbine engine of FIG. 1 in accordance with various exemplary embodiments.

FIG. 2A is a partial cross-sectional side view of at least a portion of a turbine section of an engine, such as the turbine section 150 of engine 100 of FIG. 1 in accordance with an exemplary embodiment. The illustrated turbine section 150 may be part of a high-pressure turbine or a low pressure turbine. The turbine section 150 may have an overall construction and operation that is generally known and understood by persons skilled in the art.

The depicted turbine section 150 includes at least one turbine stator assembly 200 and at least one turbine rotor assembly 250 and defines a gas flow path 210 with outer and inner flow path boundaries 205, 207 through which hot, combusted air from an upstream combustion section (e.g. combustion section 140 of FIG. 1) is directed. In practice, the annular inner flow path boundary 207 and the annular outer flow path boundary 205, as well as the stator assembly 200 and rotor assembly 250, are arranged to optimize aerodynamic and operational efficiency. Although only one turbine stator assembly 200 and one turbine rotor assembly 250 are shown, more than one may be provided with such stator assemblies 200 and rotor assemblies 250 typically being arranged in alternating axially spaced, circumferential rows.

The turbine stator assembly 200 includes a stator airfoil 202 extending between radial outer and inner stator platforms 204, 206. The stator platforms 204, 206 form a portion of the outer and inner flow path boundaries 205, 207 that partially define the flow path 210 of the turbine section 150.

The rotor assembly 250 generally includes rotor blades 252 (one of which is shown) extending from a platform 254 mounted on a rotor disc (not shown), which in turn is coupled to an engine shaft (not shown). The platform 254 defines a further portion of the inner flow path boundary 207. The rotor blades 252 extend into the flow path 210 and terminate in a radial orientation at blade tips 256.

A shroud assembly 260 circumscribes the rotor assembly 250 to form a further portion of the outer flow path boundary 205. Generally, the shroud assembly 260 is positioned to enable rotation of the rotor blades 252 while minimizing the resulting gap between the blade tips 256 and the shroud assembly 250 for operational efficiency. In particular, the gap should be minimized to control tip leakage through the gap that otherwise results in energy that is not extracted from the gas flow by driving the rotor blades 252.

During operation, the turbine stator assembly 200 directs the air toward the turbine rotor assembly 250 along the flow path 210, and as the air impinges upon rotor blades 252 of the turbine rotor assembly 250, the turbine rotor assembly 250 is driven such that power may be extracted. Further structures may be provided downstream of the turbine rotor assembly 250 to continue the flow path boundaries 205, 207 to direct air flow to further engine portions, including additional stator and/or rotor assemblies and/or the exhaust section 160 (FIG. 1).

As will now be described, exemplary embodiments of the shroud assembly 260 may be configured to perform a number of functions within the high temperature environment of the turbine section 150. As noted above, the shroud assembly 260 may be structured to minimize the turbine tip gap while avoiding interference, as well as maintaining aerodynamic characteristics, size and weight requirements, durability, life span, assembly considerations, and/or other advantages relative to conventional approaches. As was also noted above, minimizing the tip gap between the blade tips 256 and the shroud assembly 260 provides increased efficiency and performance, thereby emphasizing the importance of designing and maintaining these characteristics of the shroud assembly 260, particularly over time.

Figure 3:
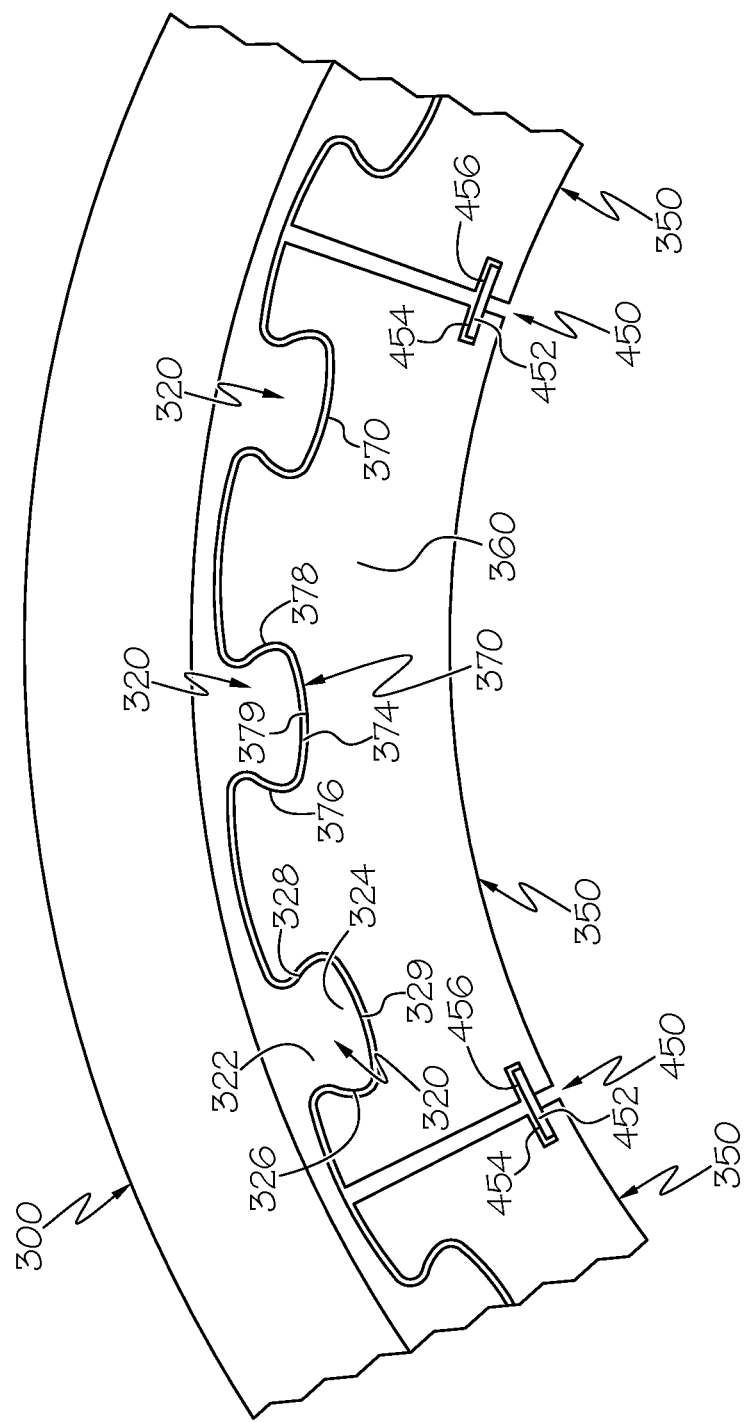
FIG. 3 is a partial cross-sectional view of the turbine section of FIG. 2A through line 3-3 in accordance with an exemplary embodiment.
Figure 4:
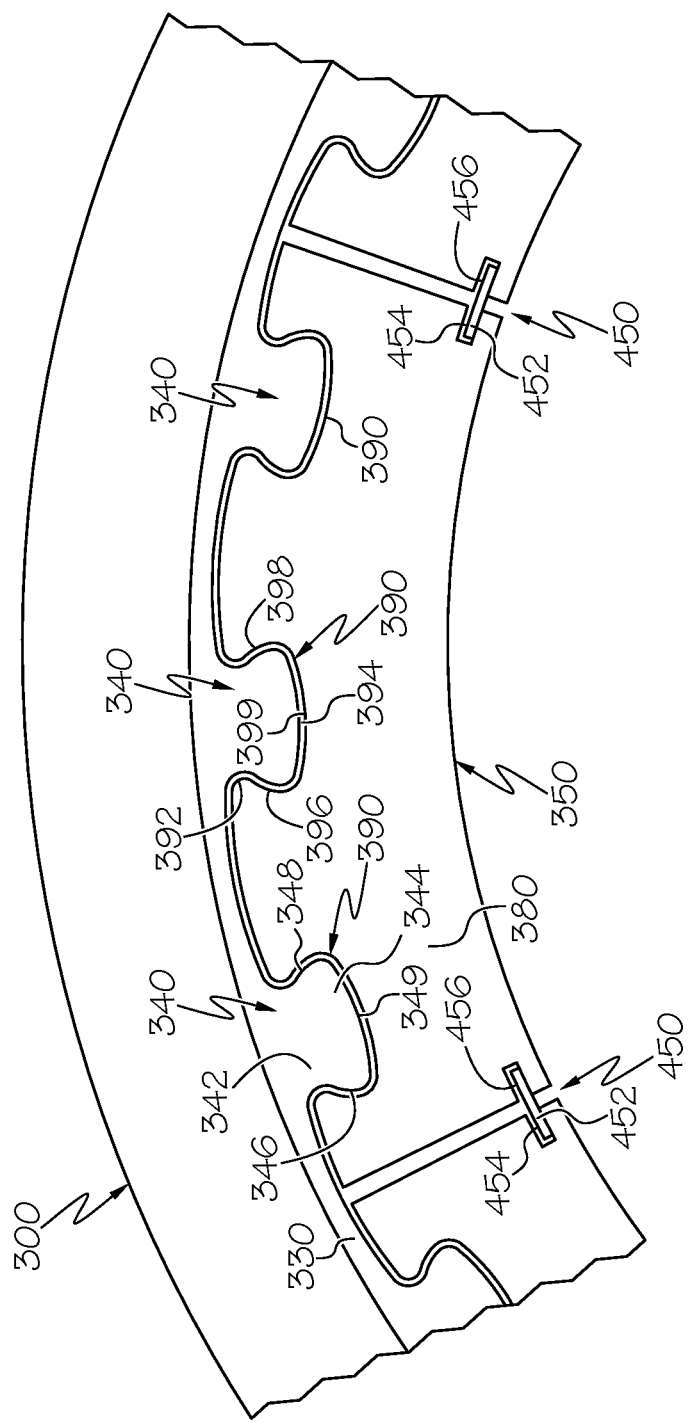
FIG. 4 is a partial cross-sectional view of the turbine section of FIG. 2A through line 4-4 in accordance with an exemplary embodiment.
Figure 5:
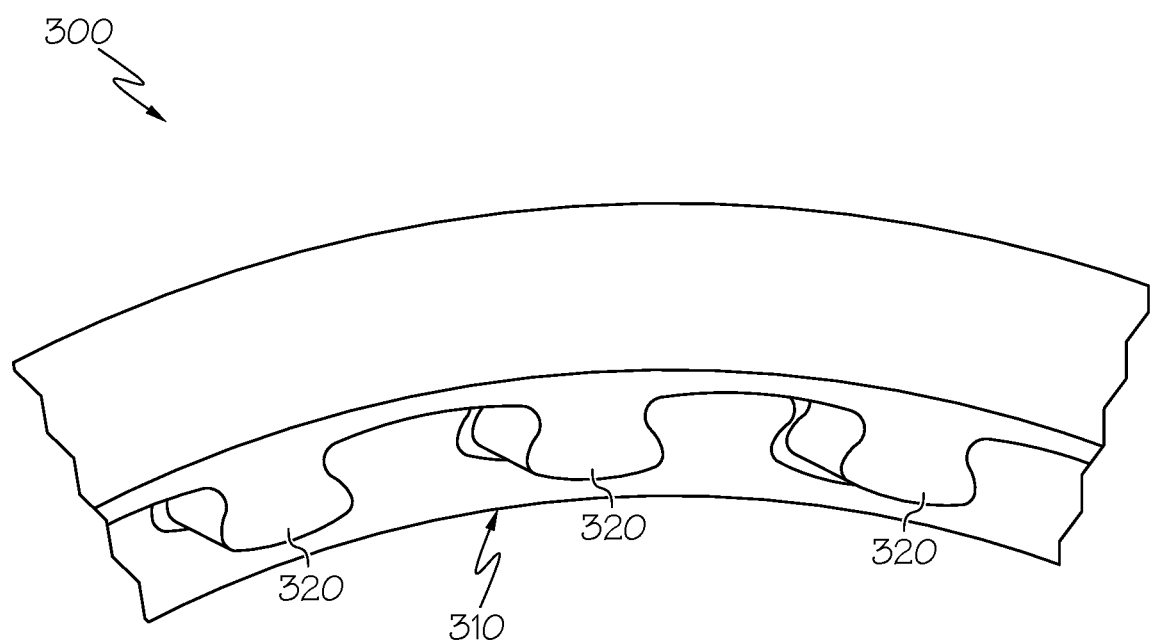
FIG. 5 is an isometric view of a portion of a shroud support structure of the turbine section of FIG. 2A in accordance with an exemplary embodiment.
Figure 6:
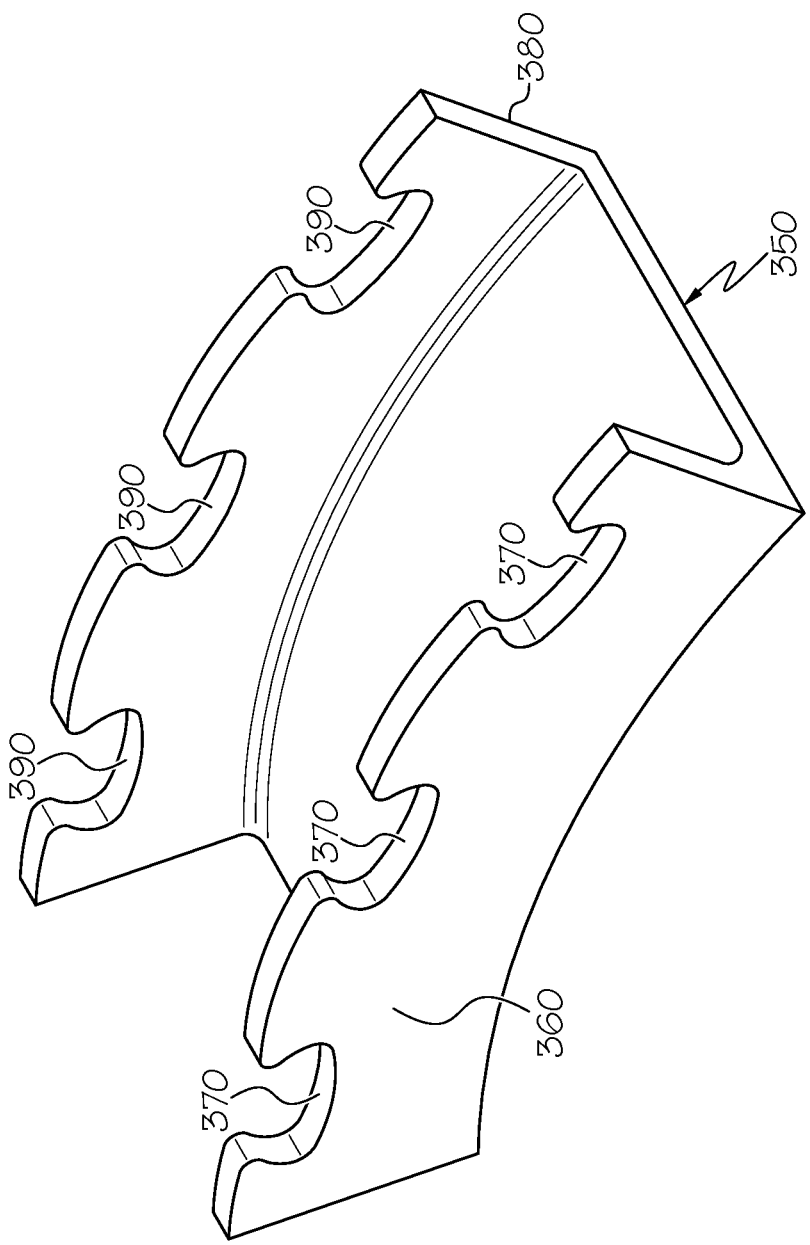
FIG. 6 is an isometric view of a shroud segment of the turbine section of FIG. 2A in accordance with an exemplary embodiment.

In one embodiment, the shroud assembly 260 is formed by a support structure 300 and a shroud segment 350. Additional components may form part of the shroud assembly 260 in some embodiments, although omitted in the discussion below for clarity. As described in greater detail below, the support structure 300 and/or shroud segment 350 may be contiguous or integral rings or separate segments arranged about the turbine section 150. In addition to FIG. 2A, the shroud assembly 260 will be described below with reference to FIGS. 3-6. FIGS. 3 and 4 are partial cross-sectional views of the turbine section 150 of FIG. 2A through lines 3-3 and 4-4, respectively, in accordance with an exemplary embodiment. FIG. 5 is an isometric view of a portion of the shroud support structure 300 of the turbine section of FIG. 2A in accordance with an exemplary embodiment; and FIG. 6 is an isometric view of the shroud segment 350 removed from the turbine section 150 in accordance with an exemplary embodiment. Although FIGS. 3-6 depict one exemplary embodiment, other exemplary embodiments may have alternate configurations or arrangements.

Generally, the support structure 300 is an annular structure that circumscribes the rotor assembly 250 to support the shroud segment 350 proximate to the rotor blades 252. In general terms, the support structure 300 may form part of the larger housing or case that houses and supports the components of the turbine section 150 and/or engine 100, or the support structure 300 may be considered a separate dedicated structure.

As shown, the support structure 300 may have a body 302 extending along generally axial and circumferential orientations. The body 302 may be considered to have outer and inner surfaces 304, 306. The support structure 300 further includes a forward support rail 310 and an aft support rail 330, each extending in a generally radial direction from the inner surface 306 of the body 302.

The forward support rail 310 may be considered to include a forward surface 312, an aft surface 314, and a periphery surface 316, and the body of the forward support rail 310 may be considered to include a main portion 318 and an engagement structure 320. The main portion 318 is axially forward of the engagement structure 320, which is generally formed in the aft and periphery surfaces 314, 316. The forward support rail 310 extends circumferentially around the turbine section 150, and as described below, includes a series of the engagement structures 320, which may be referenced below as forward first engagement structures. As also described below, the forward support rail 310 may further include a stop flange 311 extending from the periphery surface 316 of the main portion 318.

The aft support rail 330 may be considered to include a forward surface 332, an aft surface 334, and a periphery surface 336, and the body of the aft support rail 330 may be considered to include a main portion 338 and an engagement structure 340. The main portion 338 is forward of the engagement structure 340, which is generally formed in the aft and periphery surfaces 334, 336. The aft support rail 330 extends circumferentially around the turbine section 150, and as described below, includes a series of the engagement structures 340, which may be referenced below as aft first engagement structures.

Typically, the forward support rail 310 and aft support rail 330 are spaced at a distance from one another. In one embodiment, the forward support rail 310 is proximate to the forward edge of the support structure 300 and the aft support rail 330 is proximate to the aft edge of the support structure 300. In other embodiments, the support rails 310, 330 may have different positions. As examples, the forward support rail 310 may be positioned in the forward half of the support structure 300 and the aft support rail 330 may be positioned in the aft half of the support structure 300; or the forward support rail 310 may be positioned in the forward-most quarter of the support structure 300 and the aft support rail 330 may be positioned in the aft-most quarter of the support structure 300.

Generally, the shroud segment 350 is an annular structure that circumscribes the rotor assembly 250 and is supported by the support structure 300 in a position proximate to the rotor blades 252. The shroud segment 350 is configured to minimize the gap between the shroud assembly 260 and the tips of the rotor blades 252 to maximize energy extraction without interfering with rotation of the blades 252. In one embodiment, the shroud segment 350 may be a single annular piece or ring. However, generally, the shroud segment 350 is one of a series of such segments, each with a circumferential width, that collectively form a ring, as depicted by FIGS. 3, 4, and 6 and discussed below.

As shown, the shroud segment 350 may have a base 352 extending along a generally axial and circumferential orientations. As introduced above, the inner surface 356 may form part of the outer flow path boundary 205 (FIG. 2A). The base 352 may be considered to have outer and inner surfaces 354, 356 and is generally arranged parallel to the body 302 of the support structure 300. The shroud segment 350 further includes a forward segment rail 360 and an aft segment rail 380, each extending in a generally radial direction from the outer surface 354 of the base 352.

The forward segment rail 360 may be considered to include a forward surface 362, an aft surface 364, and a periphery surface 366, and the body of the forward segment rail 360 may include an engagement structure 370 generally formed in the periphery surface 366. In one embodiment, including the depicted embodiments, the engagement structure 370 extends axially through the forward segment rail 360, e.g., between the forward surface 362 and aft surfaces 364. In other embodiments, the engagement structure 370 extends axially from the aft surface 364 through only a portion of the forward segment rail 360. The forward segment rail 360 extends circumferentially around the turbine section 150, and as described below, includes a series of the engagement structures 370, which may be referenced below as forward second engagement structures.

The aft segment rail 380 may be considered to include a forward surface 382, an aft surface 384, and a periphery surface 386, and the body of the aft segment rail 380 may include an engagement structure 390 generally formed in the periphery surface 386. In one embodiment, including the depicted embodiments, the engagement structure 390 extends axially through the aft segment rail 380, e.g., between the forward and aft surfaces 382, 384. In other embodiments, the engagement structure 390 extends axially from the aft surface 384 through only a portion of the aft segment rail 380. The aft segment rail 380 extends circumferentially around the turbine section 150, and as described below, includes a series of the engagement structures 390, which may be referenced below as aft second engagement structures.

Typically, the forward segment rail 360 and aft segment rail 380 are spaced at a distance from one another. In one embodiment, the forward segment rail 360 is proximate to the forward edge of the shroud segment 350 and the aft segment rail 380 is proximate to the aft edge of the shroud segment 350. In other embodiments, the support rails 360, 380 may have different positions. As examples, the forward segment rail 360 may be positioned in the forward half of the shroud segment 350 and the aft segment rail 380 may be positioned in the aft half of the shroud segment 350; or the forward segment rail 360 may be positioned in the forward-most quarter of the shroud segment 350 and the aft segment rail 380 may be positioned in the aft-most quarter of the shroud segment 350.

During installation of the shroud assembly 260, the shroud segment 350 is positioned such that the engagement structures 370, 390 of the shroud segment 350 are aligned along an axial orientation, axially behind or aft of the engagement structures 320, 340 of the shroud support structure 300.

The shroud segment 350 is then moved forward such that the engagement structures 370, 390 of the shroud segment 350 mate with the engagement structures 320, 340 of the shroud support structure 300 to secure the shroud segment 350. The main portion 318, 338 of the support rails 310, 330, as well as the stop flange 311, function to oppose further forward movement and appropriately position the shroud segment 350. The engagement structures 320, 340, 370, 390 maintain the position of the shroud segment 350 during operation of the turbine section 150. In particular, the engagement structures 320, 370 and engagement structures 340, 390 function to interlock with one another to secure and restrict relative movement of the shroud support structure 300 and the shroud segment 350 in along the radial orientation and along the circumferential orientation. In addition to the mounting function, the engagement structures 320, 340, 370, 390 may facilitate the flow of cooling air to desired locations of the shroud assembly 260. Additional details regarding the engagement structures 320, 340, 370, 390 are provided below.

As noted above, FIG. 3 is a cross-sectional view of the shroud assembly 260 through line 3-3 of FIG. 2A. Generally, the view of FIG. 3 may be considered the radial-circumferential plane, i.e., perpendicular to the axial orientation.

FIG. 3 depicts the forward support rail 310 and engagement structures 320 of the shroud support structure 300 and the forward segment rail 360 and engagement structures 370 of the shroud segment 350. For further perspectives of these features, FIG. 5 is an isometric view of a portion of a shroud support structure 300 removed from the shroud assembly 260, and FIG. 6 is an isometric view of a shroud segment 350 removed from the shroud assembly 260.

As shown, in one embodiment, the engagement structures 320 in the forward support rail 310 are in the form of dovetail projections. In particular, the dovetail projections 320 are generally trapezoid-shaped with a relatively narrow root 322 that extends radially inward to a head portion 324 with angled side walls 326, 328 and a top wall 329. As such, the side walls 326, 328 of the dovetail projections 320 diverge from the root 322 such that the circumferential width of the projections 320 increases along the radial height. In one embodiment, each of the walls 326, 328, 329 is relatively flat or planar. In other embodiments, the walls 326, 328, 329 may be curved.

As previously introduced and discussed in greater detail below, an array of multiple dovetail projections 320 are provided along the circumferentially extending forward support rail 310 on the annular shroud support structure 300. Moreover, the dovetail projections 320 may be considered to have a length or longitudinal axis extending along the axial orientation. As noted above, FIG. 5 is an isometric view of a portion of a shroud support structure 300 removed from the shroud assembly 260.

Returning to FIG. 3, the engagement structures 370 in the forward segment rail 360 of the shroud segment 350 are in the form notches that match the dovetail projections 320 of the shroud support structure 300. In particular, the dovetail notches 370 are generally trapezoid-shaped with a relatively narrow mouth or opening 372, and angled side walls 376, 378 that extend radially inward and circumferentially outward to an interior portion 374 and a bottom wall 379. In one embodiment, each of the walls 376, 378, 379 is relatively flat or planar. In other embodiments, the walls 326, 328, 329 may be curved. Since the width (in the circumferential orientation) of the notch decreases from bottom wall 379 to the mouth 372, the notch 370 may be considered an obscured or partially enclosed notch. Such a partially enclosed notch 370 may be considered any notch in which the width of any interior portion, including the bottom wall or otherwise, is greater than the width of any other portion relatively closer to the mouth.

Like the dovetail projections 320, the dovetail notches 370 generally have a length or longitudinal axis extending along the axial orientation. An array of multiple dovetail notches 370 are formed along the circumferentially extending forward segment rail 360 on the annular shroud segment 350. As noted above, FIG. 6 is an isometric view of a shroud segment 350 removed from the shroud assembly 260 and particularly depicts the dovetail notches 370 along the forward segment rail 360 of the shroud segment 350.

FIG. 4 depicts the aft support rail 330 and engagement structures 340 of the shroud support structure 300 and the aft segment rail 380 and engagement structures 390 of the shroud segment 350. For further perspectives of these features, FIG. 6 is an isometric view of a shroud segment 350 removed from the shroud assembly 260.

As shown, in one embodiment, the engagement structures 340 in the aft support rail 330 are in the form of dovetail projections with characteristics similar or identical to the dovetail projections 320 in the forward support rail 310. In particular, the dovetail projections 340 are generally trapezoid-shaped with a relatively narrow root 342 that extends radially inward to a head portion 344 with angled side walls 346, 348 and a top wall 349. In one embodiment, each of the walls 346, 348, 349 is relatively flat or planar. In other embodiments, the walls 346, 348, 349 may be curved.

The dovetail projections 340 generally have a length or longitudinal axis extending along the axial orientation. An array of multiple dovetail projection 340 along the circumferentially extending aft support rail 330 on the annular shroud support structure 300.

The engagement structures 390 in the aft segment rail 380 of the shroud segment 350 are in the form notches that match the dovetail projections 340 of the shroud support structure 300. In particular, the dovetail notches 390 are generally trapezoid-shaped with a relatively narrow mouth or opening 392 that extends radially inward to an interior portion 394 with angled side walls 396, 398 and a bottom wall 399. In one embodiment, each of the walls 396, 398, 399 is relatively flat or planar. In other embodiments, the walls 396, 398, 399 may be curved. Since the width (in the circumferential orientation) of the notch 390 decreases from bottom wall 399 to the mouth 392, the notch 390 may be considered an obscured or partially enclosed notch, as introduced above.

The dovetail notches 390 generally have a length or longitudinal axis extending along the axial orientation. An array of multiple dovetail notches 390 are positioned along the circumferentially extending aft segment rail 380 on the annular shroud segment 350.

As noted above, FIG. 6 is an isometric view of a shroud segment 350 removed from the shroud assembly 260 and particularly depicts the dovetail notches 370, 390 along the forward and aft segment rail 360, 380 of the shroud segment 350. In the depicted embodiment, three dovetail notches 370, 390 are formed in each of the segment rails 360, 380 for a particular portion or segment 350. In other embodiments, a different number of notches 370, 390 may be formed in one or both of the rails 360, 380, including one, two, or more than three. Additionally, respective pairs of dovetail notches 370, 390 may be axially aligned, as depicted, or clocked in other embodiments. As noted above, the arrangement of the notches 370, 390 matches the arrangement of projections 320, 340 such that pairs of notches 370, 390 and projections 320, 340 suitably engage one another.

As indicated above, the engagement structures 320, 340 in the support rails 310, 330 of the shroud support structure 300 are dovetail projections or tabs in the depicted embodiments; and the engagement structures 370, 390 in the segment rails 360, 380 of the shroud segment 350 are notches or channels in the depicted embodiments. However, in other embodiments, arrangement of the dovetail projections and notches may be partially or completely reversed. For example, the engagement structures on the support rails of the shroud support structure 300 may be notches, and the engagement structures in the segment rails of the shroud segment 350 may be dovetail projections. Further, the dovetail projections and notches may also be intermixed on a single structure (e.g., the shroud support structure or the shroud segment) or along a single rail.

In the embodiments discussed above, the projections 320, 340 and corresponding notches 370, 390 have dovetail shapes. However, any shape that provides a mechanism for interlocking the engagement structures in the radial and circumferential orientations may be provided. For example, the projections and notches may have matching "fir tree" or multi-lobed shapes; keyhole shapes; "T" shapes; diamond shapes; and the like. As noted above, the notches may be any type of obscured or partially enclosed trench with the projections having corresponding shapes. Additionally, the projections 320, 340 of FIGS. 2-6 are generally considered "blind" or "half-blind" dovetails, although in other embodiments, the projections 320, 340 may be through dovetails. In further embodiments, one or both of the corresponding projections 320, 340 and notches 370, 390 may be partial dovetails.

As shown in FIG. 2A, in one embodiment, the shroud support structure 300 and shroud segment 350 may be configured such that, upon engagement of the engagement structures 320, 340, 370, 390, the support rails 310, 360 completely overlap the respective segment rails 360, 380 along the axial orientation. In other embodiments, the support rails 310, 360 may not overlap segment rails 360, 380, and/or the segment rails 360, 380 may completely overlap the support rails 310, 360.

Again referencing FIG. 2A, the positions and configurations of the shroud support structure 300 and shroud segment 350 function to form a cavity 400. Radially, the cavity 400 may be formed by the inner surface 306 of the body 302 of the support structure 300 and the outer surface 354 of the base 352 of the shroud segment 350. Axially, the cavity 400 may be formed by one or both of the forward support rail 310 and forward segment rail 360 and one or both of the aft support rail 330 and aft segment rail 380. Typically, the cavity 400 extends circumferentially around the shroud assembly 260, e.g., between the support structure 300 and ring of shroud segments 350.

The cavity 400 may have any suitable dimensions, including those dependent on the axial thicknesses of the engagement structures 320, 340, 370, 390 and/or rails 310, 330, 360, 380. In some embodiments, the cavity 400 may have an axial length that is a function of the axial length of the tip of blade 252. For example, the cavity 400 may have an axial length that is at least 50% of the axial length of the tip of blade 252. In other embodiments, the cavity 400 may have an axial length that is at least 70% or 80% of the axial length of the tip of blade 252. In a corresponding manner, the axial lengths of the engagement structures 320, 340, 370, 390 may be a function of the axial length of the tip of the blade 252. For example, collectively, the engagement structures 320, 340, 370, 390 may have an axial length that is less than 50% of the axial length of the tip of blade 252. In other embodiments, the engagement structures 320, 340, 370, 390 may have a collective axial length that is less than 20% or 30% of the axial length of the tip of blade 252. This configuration provides a cavity 400 with a volume that is suitable for introducing cooling air for the shroud assembly 260, as will now be discussed.

In some embodiments, the cavity 400 enables the shroud support structure 300 and particularly the shroud segment 350 to be cooled. For example, cooling holes 490 may be formed in the body 302 of the support structure 300. Cooling air, typically obtained as bleed air from the compressor or other source, may flow through the support structure 300 via the holes 490 and into the cavity 400 such that the cooling air impinges upon the outer surface 354 or aft segment rail 380 of the shroud segment 350, thereby cooling the shroud segment 350. Subsequently, the air may flow circumferentially through the cavity 400. The holes 490 may have any suitable orientation or combination of orientations (e.g., radial, axial, and/or circumferential) such that air is delivered to a desired location. Any number, size, or arrangement of holes 490 may be provided. In other embodiments, the holes 490 may additionally or alternatively be formed in one or more of the rails 310, 330, 360, 380.

Figure 2B:
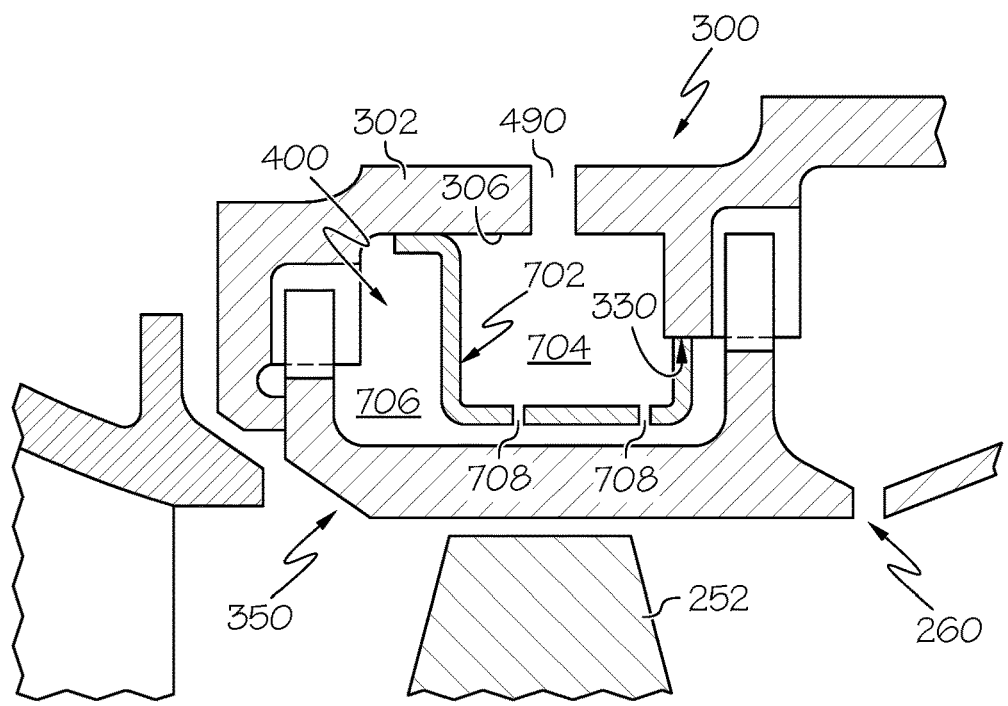
Figure 2C:
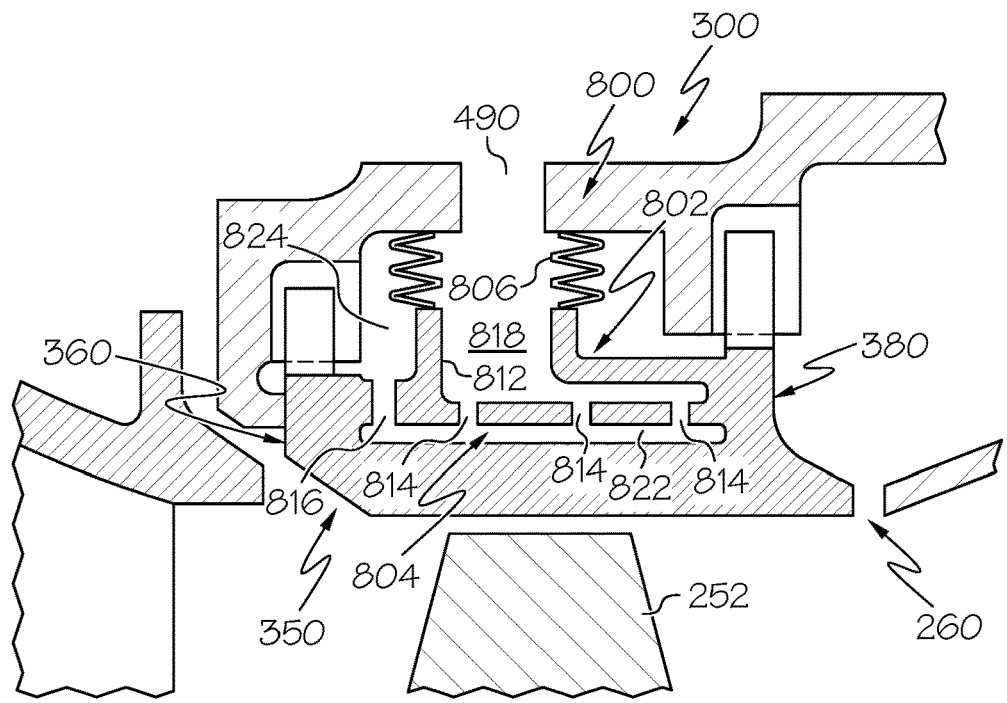

It will be appreciated that the cooling configuration depicted in FIG. 2A and described above is merely one example of a cooling configuration, and that various other cooling configurations could be used. For completeness, two additional cooling configurations are depicted in FIGS. 2B and 2C, and will now be described. Before doing so, it is noted that these additional cooling configurations are also not exhaustive of the cooling configurations that could be implemented. It is further noted that like reference numerals in FIGS. 2A, 2B, and 2C refer to like parts.

Turning first to FIG. 2B, with this cooling configuration, the shroud assembly 260 additionally includes a baffle 702. The baffle 702 is disposed in the cavity 400 to define an upstream plenum 704 and a downstream plenum 706. In the depicted embodiment, the baffle 702 is coupled at one end to aft support rail 330 and at another end to the inner surface 306 of the body 302. It will be appreciated, however, that this is merely one example. The baffle 702 includes a plurality of orifices 708 that fluidly communicates the upstream plenum 704 with downstream plenum 706. Thus, with this configuration, cooling air may flow through the holes 490 and into the upstream plenum 704, then through the orifices 708 into the downstream plenum 706 to thereby cool the shroud segment 350.

In FIG. 2C, cooling configuration, the shroud assembly 260 includes a dual-wall baffle structure 800 that is formed integrally with the shroud segment, extends between the forward and aft segment rails 360, 380. The baffle structure 800 includes an outer wall 802 and an inner wall 804. The outer wall 802 has an aperture formed therein. A seal 806 is coupled to the outer wall 802 and surrounds the aperture, and is also coupled to inner surface 306 of the body 302. As FIG. 2C further depicts, the inner wall 804 includes one or more orifices 814 on one side of the aperture, and one or more orifices 816 on the other side of the aperture. This configuration thus defines a first plenum 818, a second plenum 822, and a third plenum 824. As may be appreciated, with this configuration, cooling air may flow through the holes 490 and into the first plenum 818 via the aperture, through the one or more orifices 814 into the second plenum 822, then through the one or more orifices 816 into the third plenum 824.

As introduced above and referring now to FIGS. 3 and 4, in one embodiment, a number of shroud segments 350 are circumferentially arranged relative to one another to form a full shroud ring. In some embodiments, one or more feather seals 450 may be inserted in between adjacent shroud segments 350. As shown, feather seals 450 may be relatively thin segments of material 452 that are partially arranged in opposing slots 454, 456 formed in adjacent shroud segments 350. The feather seals 450 may operate to mitigate or prevent leakage of cooling air out of cavities 400 formed between the shroud support structure 300 and shroud segment 350. Although one feather seal 450 is depicted between adjacent segments 350, multiple and/or partial seals may be provided. In some embodiments, the feather seals 450 may be omitted and/or other types of seals may be used.

Accordingly, exemplary embodiments discussed herein provide turbine sections, shroud assemblies, and/or shroud segments that enable improvement with respect to securing the shroud segments to the shroud support structures. The embodiments enable the formation of a cavity such that cooling air may be provided to the shroud assembly, thereby improving temperature management, operational characteristics, durability, and life span. Embodiments may find beneficial use in many industries and applications, including aircraft propulsion, auxiliary power units, electricity generation, naval propulsion, pumping sets for gas and oil transmission, automobile engines, and stationary power plants.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A turbine shroud assembly, comprising:
   a shroud support with a forward support rail and an aft support rail extending radially and about a circumferential orientation, wherein the forward support rail includes a first inner periphery defining a first inner periphery surface that faces radially inward and the aft support rail includes a second inner periphery defining a second inner periphery surface that faces radially inward, wherein the forward support rail includes a forward first dovetail structure formed in the first inner periphery surface, wherein the aft support rail includes an aft first dovetail structure formed in the second inner periphery; and
   a shroud segment with a forward segment rail and an aft segment rail extending radially and about the circumferential orientation, wherein the forward segment rail has a first outer periphery defining a forward segment rail periphery surface that faces radially outward, wherein the rear segment rail has a second outer periphery defining an aft segment rail periphery surface that faces radially outward, wherein the forward segment rail includes a forward second dovetail structure formed in the forward segment rail periphery surface and the aft segment rail includes an aft second dovetail structure formed in the aft segment rail periphery surface, and
   wherein the forward first dovetail structure is configured to radially and circumferentially engage with the forward second dovetail structure, wherein the forward second dovetail structure extends axially only partially through the forward support rail, and the aft first dovetail structure is configured to radially and circumferentially engage with the aft second dovetail structure, wherein the aft second dovetail structure extends only partially through the aft support rail, to radially and circumferentially interlock the shroud segment to the shroud support.

2. The turbine shroud assembly of claim 1, wherein the forward support rail includes a radially extending segment, wherein the forward first dovetail structure mates with the forward second dovetail structure and the aft first dovetail structure mates with the aft second dovetail structure such that the radially extending segment of the forward support rail completely overlaps the forward segment rail along the axial orientation.

3. The turbine shroud assembly of claim 1, wherein one of the forward first dovetail structure or the forward second dovetail structure is a partially enclosed notch that includes a bottom wall disposed away from the respective first inner periphery or first outer perimeter and a mouth at the first inner periphery or at the first outer perimeter respectively, wherein a notch circumferential width of the notch is greater at the bottom wall than at the mouth, and the other of the forward first dovetail structure or the forward second dovetail structure is a projection with a root, wherein the projection diverges from the root such that a projection circumferential width of the projection increases along a radial height of the projection to the first inner periphery or to the second inner periphery respectively.

4. The turbine shroud assembly of claim 3, wherein both the aft first dovetail structure and the aft second dovetail structure includes a partially enclosed notch with a mouth opening through the first inner periphery and at the second inner periphery, respectively and includes a projection interlocking with the partially enclosed notch and extending through the first inner periphery and at the second inner periphery, respectively.

5. The turbine shroud assembly of claim 1, wherein the forward first dovetail structure and the aft first dovetail structure are each formed by an array of projections, and wherein the forward second dovetail structure and the second dovetail structure are each formed by an array of partially enclosed notches opening through the first outer periphery and the second outer periphery, respectively.

6. The turbine shroud assembly of claim 5, wherein the array of projections is an array of dovetail projections each with a root, wherein the projections diverge from the root such that a projection circumferential width of the projections increases along a radial height of the projections to the first inner periphery or to the second inner periphery respectively and the array of partially enclosed notches are dovetail notches configured to receive the array of dovetail projections.

7. The turbine shroud assembly of claim 1, wherein the shroud segment includes a base from which the forward segment rail and the aft segment rail radially extend and the shroud support includes a body from which the forward support rail and the aft support rail radially extend, and wherein the turbine shroud assembly further comprises a cavity at least partially formed by the body of the shroud support, the forward support rail, the aft support rail, the forward segment rail, the aft segment rail, and the base of the shroud segment, and comprising a baffle disposed in the cavity and defining an upstream plenum and a downstream plenum, the baffle coupled to the aft support rail and to the body, the baffle including a plurality of orifices that fluidly couple the upstream plenum with downstream plenum.

8. The turbine shroud assembly of claim 1, wherein the forward support rail includes a stop flange extending radially inward further than the second inner periphery of the aft support rail, the stop flange extending axially to axially position the shroud segment relative to the shroud support.

9. The turbine shroud assembly of claim 1, comprising a baffle extending between the forward segment rail and the aft segment rail, and a seal engaging the baffle and the shroud support.

10. The turbine shroud assembly of claim 1, wherein the shroud support includes a base from which the forward and aft support rails extend, and comprising a baffle extending between and engaging the aft segment rail and the base.

11. A shroud segment for a turbine shroud assembly of a gas turbine engine having a shroud support with a forward support rail including a forward engagement projection that extends radially inward and an aft support rail including an aft engagement projection, the shroud segment comprising:
a base;
a forward segment rail extending radially from the base and along a circumferential orientation parallel to the forward support rail, wherein the forward segment rail extends to a first outermost periphery surface, and includes a forward engagement notch defined through the first outermost periphery surface, the forward engagement notch having a forward mouth that opens through the first outermost periphery surface; and
an aft segment rail extending radially from the base and along the circumferential orientation parallel to the aft support rail, wherein the aft segment rail extends to a second outermost periphery surface, and includes an aft engagement notch defined through the second outermost periphery surface, the aft engagement notch having an aft mouth that opens through the second outermost periphery surface,
wherein the forward engagement notch is configured to radially and circumferentially engage the forward engagement projection, with the forward engagement projection extending into the forward engagement notch and extending through the forward mouth, wherein the forward segment rail, for an axial length of the forward engagement notch, extends axially only partially through the forward support rail, and the aft engagement notch is configured to radially and circumferentially engage the aft engagement projection, with the aft engagement projection extending into the aft notch and extending through the aft mouth, wherein the aft segment rail, for an axial length of the aft engagement notch, extends axially only partially through the aft support rail, to radially and circumferentially interlock the shroud segment to the shroud support.

12. The shroud segment of claim 11, wherein the forward support rail includes a radially extending segment that includes the forward projection and mates with the forward engagement notch such that the forward support rail completely overlaps the forward segment rail along an axial orientation.

13. The shroud segment of claim 11, wherein the forward engagement notch comprises a partially enclosed notch and the forward engagement projection comprises a dovetail that includes a root and extends radially to a head portion with angled side walls and a top wall, the side walls diverging from the root such that a circumferential width of the forward engagement projection increases along a radial height.

14. The shroud segment of claim 11, wherein one of the forward support rail includes a stop flange extending radially inward further than an inner periphery of the aft support rail, the stop flange extending axially to axially position the shroud segment relative to the shroud support.

15. The shroud segment of claim 11, wherein the forward engagement projection and the aft engagement projection are each formed by an array of projections, and wherein the forward engagement notch and the aft engagement notch are each formed by an array of partially enclosed notches.

16. The shroud segment of claim 15, wherein the array of projections is an array of dovetail projections and the array of partially enclosed notches are dovetail notches configured to receive the array of dovetail projections.

17. The shroud segment of claim 11, wherein the base, the forward segment rail, and the aft segment rail form a cavity with the shroud support that is configured to receive cooling air.

18. The shroud segment of claim 11, comprising a baffle extending between the forward segment rail and the aft segment rail, and a seal engaging the baffle and the shroud support.

19. The shroud segment of claim 11, wherein the shroud support includes a base from which the forward and aft support rails extend, and comprising a baffle extending between and engaging the aft segment rail and the base.

20. A turbine shroud assembly, comprising:
a shroud support with a body wherein a forward support rail with a first axial thickness and an aft support rail with a second axial thickness each extend radially from the body along a circumferential orientation, wherein the forward support rail includes a first array of dovetail projections with a third axial thickness, and wherein the aft support rail includes a second array of dovetail projections with a fourth axial thickness, wherein the first axial thickness is greater than the third axial thickness and the second axial thickness is greater than the fourth axial thickness; and
a circumferential series of shroud segments, each of the shroud segments including a base wherein a forward segment rail with a first outer periphery and an aft segment rail with a second outer periphery each extend radially from the base along the circumferential orientation, wherein the forward segment rail includes a first array of dovetail notches opening through the first outer periphery of the forward segment rail, and wherein the aft segment rail includes a second array of dovetail notches opening through the second outer periphery of the aft segment rail,
wherein the first array of dovetail notches of the circumferential series of shroud segments is configured to mate with the first array of dovetail projections of the shroud support with the first array of dovetail projections extending through the first outer periphery, and the second array of dovetail notches of the circumferential series of shroud segments is configured to mate with the second array of dovetail projections of the shroud support with the second array of dovetail projections extending through the second outer periphery such that the circumferential series of shroud segments are radially and circumferentially interlocked to the shroud support, with the forward segment rail extending axially only partly through the forward support rail and the aft segment rail extending axially only partly through the aft support rail.

* * * * *